United States Patent [19]

Takai

[11] 4,273,389

[45] Jun. 16, 1981

[54] BALL SPLINE BEARING ASSEMBLY

[75] Inventor: Takamoto Takai, Tokyo, Japan

[73] Assignee: Nippon Thompson, Co., Ltd., Tokyo, Japan

[21] Appl. No.: 87,788

[22] Filed: Oct. 24, 1979

[51] Int. Cl.³ ............................................. F16C 31/06
[52] U.S. Cl. ..................................... 308/6 C; 308/187
[58] Field of Search .................. 308/6 R, 6 C, 73, 187

[56] References Cited

U.S. PATENT DOCUMENTS

| | | | |
|---|---|---|---|
| 3,797,897 | 3/1974 | Schaeffler | 308/6 C |
| 3,807,814 | 4/1974 | Stopp | 308/73 |
| 4,123,121 | 10/1978 | Ernst et al. | 308/6 C |

Primary Examiner—Frederick R. Schmidt
Attorney, Agent, or Firm—L. Lawton Rogers, III

[57] ABSTRACT

A ball spline bearing assembly comprising an outer ring having a plurality of axial endless ball raceways formed in its inside and projections provided on both of the axial ends corresponding to the axial and circumferential positions of the ball raceways, a shaft fitted therein axially and slidably, balls circulated in the ball raceways, and a ball cage fitted to the inside of the outer ring and having a plurality of axial ball slots each formed corresponding to the ball raceways, each slot having a length equal to the axial distance between the projections provided on the opposing axial ends of the outer ring and a width capable of fitting the projection therein and retaining the balls while partially exposing them. The outer ring has preferably formed at its outer circumferential surface a lubricating groove communicating directly to each of the endless ball raceways.

6 Claims, 6 Drawing Figures

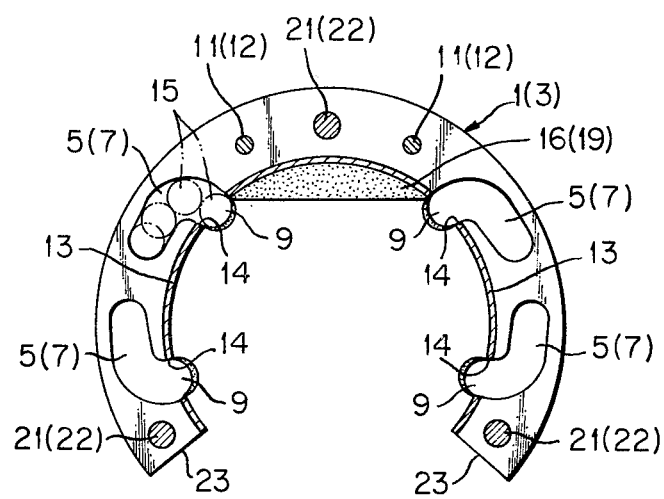
FIG_4
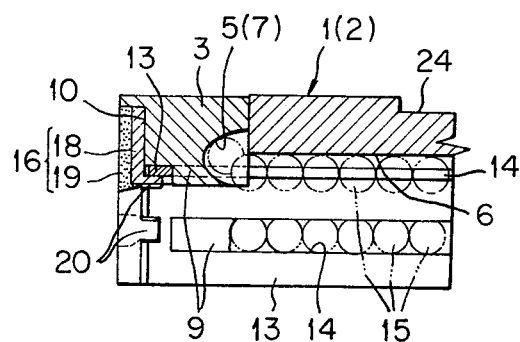
FIG_5

BALL SPLINE BEARING ASSEMBLY

BACKGROUND OF THE INVENTION

1. Field of the Invention

This invention concerns a ball spline bearing assembly and, in particular, it relates to a ball spline bearing assembly of a type in which an outer ring of the bearing assembly engages therein a track shaft axially and movably by way of rolling contact of balls contained along the endless raceways formed axially to the inner surface of the outer ring.

2. Description of the Prior Art

Ball spline bearing assemblies and ball slide mechanisms employing them have been proposed and put to practice in recent years, for example, as disclosed in U.S. Pat. Nos. 3,897,982, 4,040,679, or the like. Known ball spline bearing assemblies generally comprise, in combination, an outer ring capable of engaging therein a track shaft axially and slidably and formed with a plurality of axial ball circuits each consisting of a non-load raceway and a load raceway in pair, balls circulated in an endless manner in the ball circuits and a ball cage coaxially combined to the inner side of the outer ring so as to retain the balls while partially exposing them through the slots for rolling contact with the slide surface of the track shaft.

These known assemblies, however, are not quite satisfactory in that they are difficult to fabricate since the structure of the ball cage is much complicated because the cage has to be aligned directly to the outer ring upon setting up of the assembly. This also presents a difficulty in attaining a desired accuracy for the fabrication of the ball slots in the ball cage. In addition, while, in one of such known ball spline bearings, lubrication has been effected, for example, by feeding lubricant only to one of a plurality of ball raceways to wet the balls therein, which then transfer the attached lubricant during rolling movement by way of the track shaft to the balls in other ball raceways, it takes too much time for complete lubrication throughout the entire raceways often resulting in lubrication with metal dust-contaminated lubricant to thereby impair the performance and decrease the service life of the ball bearings.

SUMMARY OF THE INVENTION

In accordance with this invention a novel ball spline bearing assembly proposed comprises a hollow cylindrical outer ring having a plurality of axially extending endless ball raceways formed in its inside, a shaft fitted therein axially slidably, balls contained in the endless ball raceways and a ball cage coaxially combined between the inner circumferential surface of the outer ring and the outer circumferential surface of the shaft and formed with a plurality of axially extending ball slots for retaining the ball corresponding to the ball raceways in the outer ring, wherein projections for engagement with both of the axial ends of the ball slots are provided to both of the axial inner ends of the outer ring at the positions corresponding to the axial ends of the ball raceways and the ball slots formed in the ball cage having an axial length equal to the axial distance between the projections and has such a width as capable of retaining the balls and just fitting to the projections, to thereby secure the ball cage in an exact alignment to the outer ring unmovably both axially and circumferentially relative thereto by way of the fitting engagement between the projections and the axial ends of the ball slots.

In a preferred embodiment of this invention, each of the endless ball raceways formed to the inside of the outer ring consists of a pair of non-load raceway extended axially through the ring wall and a load raceway extended axially along the inner circumferential surface of the outer ring, and the outer ring consists of a ring main body to which the load and non-load raceways are formed and a pair of guide plates, combined to both of the axial ends of the ring main body, which has recessed channels for enabling the load and non-load raceways in pair communicating to each other at their axial ends to complete an endless ball raceway and the projections provided to the inner sides of both of the guide plates at the circumferential positions corresponding to those of the axial ends of the load raceways for fitting engagement with the axial ends of the ball slots formed in the ball cage.

In a further preferred embodiment of this invention, the outer circumference of the outer ring is eccentrically formed with an arcuate lubricating groove, from which a plurality of lubricating ports are directly led through the ring wall to each of the endless ball raceways respectively for the effective lubrication of the ball raceways.

Accordingly, it is an object of this invention to provide a ball spline bearing assembly wherein a ball cage simple in structure can be aligned to the outer ring of the bearing assembly with ease.

It is another object of this invention to provide a ball spline bearing assembly capable of employing a ball cage simple in structure and thus ensuring an improved accuracy for the fabrication of ball slots with ease.

It is a further object of this invention to provide a ball spline bearing assembly capable of effecting satisfactory lubrication throughout the ball raceways.

BRIEF DESCRIPTION OF THE ACCOMPANYING DRAWINGS

These and other features and advantages of this invention will become apparent from the following detailed descriptions given by way of its preferred embodiment referring to the accompanying drawings, wherein FIG. 1 is an exploded perspective view of the ball spline bearing assembly as an embodiment of this invention;

FIG. 4 is a transverse cross sectional view taken along line IV—IV in FIG. 3;

FIG. 5 is a transverse cross sectional view taken along line V—V in FIG. 2; and

DETAILED DESCRIPTION OF PREFERRED EMBODIMENTS

Figure 1:
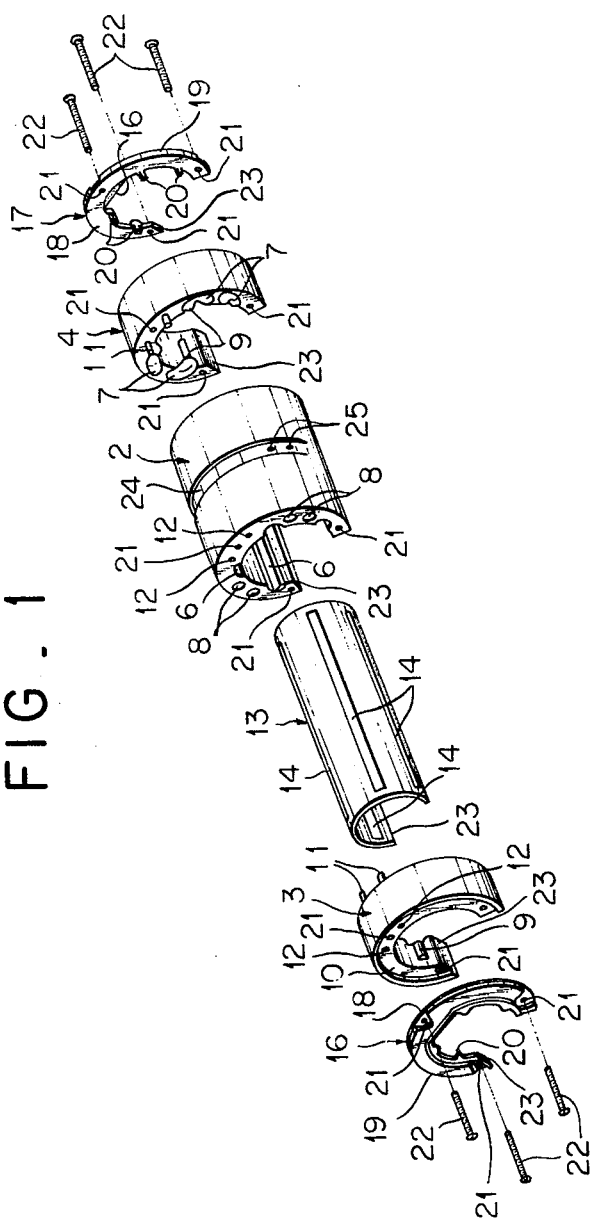

FIG. 1 through FIG. 6 show a ball spline bearing assembly as a preferred embodiment of this invention, which is applied to a ball slide way mechanism. The ball spline bearing assembly basically comprises an outer ring 1, a ball cage 13 axially disposed to the inside of the outer ring 1, balls 15 retained between the outer ring 1 and the case 13, and seal plates 16, 17 disposed at both of the axial ends of the outer ring 1. The outer ring 1 further consists of a ring main body 2 and a pair of guide plates 3, 4 combined to the respective axial ends thereof. Knock pins 11, 11 planted on the inner side of each of the guide plates 3, 4 and pin holes 12, 12 apertured in the respective outer sides of the ring main body 2 constitute an engaging mechanism which ensures exact circumferential alignment between the guide plates 3, 4 and the ring main body 2. An annular engaging recess 10 is formed in each of the outer sides of the guide plates 3, 4 for engagement with the seal plates 16, 17, each of which is made of a rigid plate 18 such as of metal and a soft plate 19 such as of rubber integrally fused at its outer side. A plurality of mounting holes 21 are formed in both of the axial ends of the ring main body 2 of the outer ring 1, each of the guide plates 3, 4, as well as in each of the seal plates 16, 17 at the corresponding positions, and the ring main body, guide plates and seal plates can be combined integrally to each other by common bolts 22 threading into each of the mounting holes 21.

Figure 2:
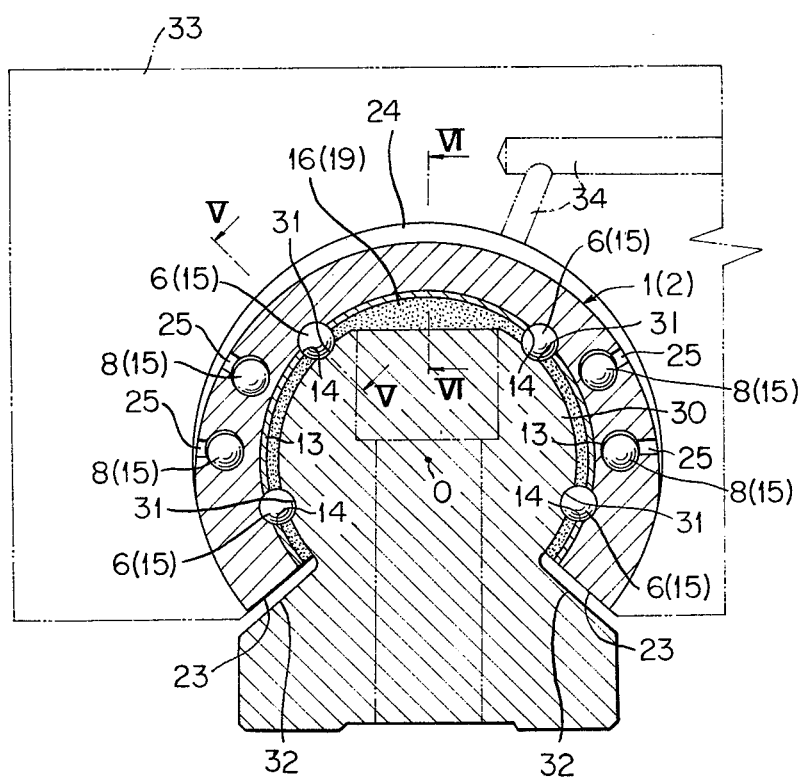
FIG. 2 is a vertical cross sectional view of the embodiment in FIG. 1.

As best shown in FIG. 2 in a transverse cross section, the ring main body 2 has formed therethrough an axial bore and an axial recess in continuous relation to the bottom of the bore for engaging therein a track shaft 30 extended axially. The track shaft 30 has, in cross section, a solid circular portion which is for axial sliding engagement with the inner circumferential surface of the bore in the ring main body 2 and a trapezoidal base portion which continues to the bottom of the circular portion through the axial recess in the ring main body 2 for setting the lower shoulders 23, 23 of the ring main body 2 on both of the oblique line of the trapezoidal base. The upper circular portion of the track shaft 30 is formed with a plurality of (four in all in this embodiment) axially extending spline grooves 31 along its circumferential surface each at the positions corresponding to the vertexes of an imaginary trapezoid inscribing the circle of the circular portion as seen in the cross section.

Referring to the ring main body 2, a plurality of grooves are formed axially to the inner surface of the bore in the ring main body 2 as load raceways 6 each at the circumferential position facing to those of the spline grooves 31 on the track shaft 32. A plurality of axial holes are apertured as non-load raceways 8 through the wall of the ring main body 2 each paired respectively to the load raceways 6 and at the positions outside of the oblique lines of the imaginary trapezoid.

Figure 3:
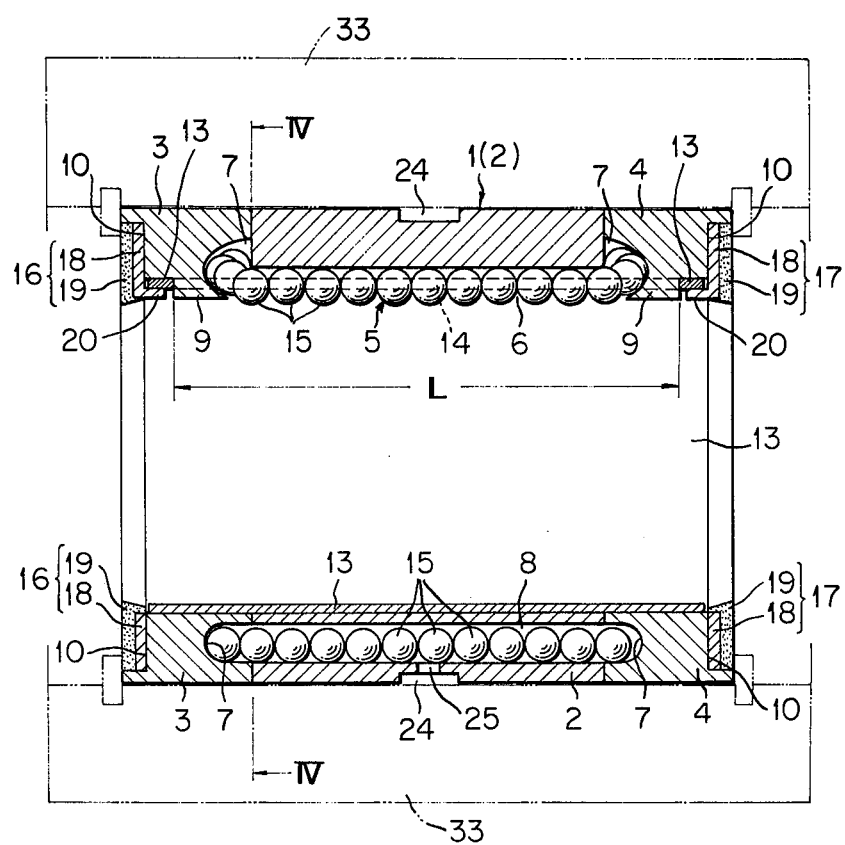
FIG. 3 is a transverse cross sectional view of the embodiment in FIG. 1.

A plurality of communication channels 7 for connecting those pairs of the load raceways 6 and the non-load raceways 8 at their axial ends are formed in the axial inner sides of the guide plates 3, 4 at the positions corresponding to the axial ends for each of the raceways 6, 8 to complete endless ball raceways 5 through which balls 15 are circulated in an endless manner as shown in details in FIG. 3 and FIG. 4. A plurality of projections 9 are formed on the inner circumferential surface of the opposing guide plates 3, 4 each corresponding to the extension of the load raceway 6 and they project centripetally for alignment with the ball cage as described later.

The ball cage 13 coaxially disposed between the bore inner wall and the sliding surface of the track shaft for retaining the balls 15 running along the load raceways 6 has a circular cross section similar to that of the bore and radially expanding resiliency. A plurality of axial ball slots 14 are formed to the circumferential surface for retaining the balls 15 in the corresponding load raceways 6, while partially exposing them through the slots 14 to effect desired axial sliding contact between the outer ring 1 and the track shaft 30. Since the axial length and the circumferential position for each of the load raceways 6 are defined as above by the provision of the projections 9 on the inner sides of the guide plates 3, 4, the ball slots 14 in the ball cage 13 are shaped and arranged corresponding to the projections 9 so that the slots 14 may be aligned with the load raceways 6 respectively.

Figure 6:
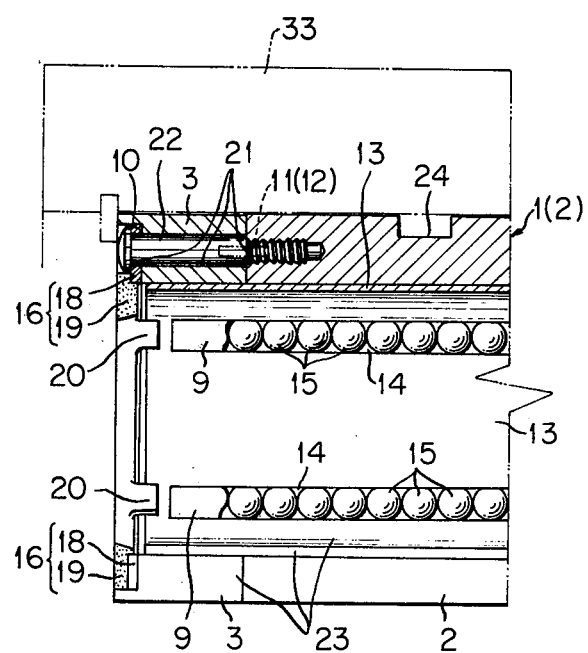
FIG. 6 is a transverse cross sectional view taken along line IV-VI in FIG. 2.

Specifically, as shown in FIG. 3 and FIG. 5 or 6, the circumferential position for each of the ball slots 14 corresponds to the circumferential position for each of the load raceways 6, and each of the ball slots 14 has a length L equal to the axial distance between the two projections 9 opposing to each other on the pair of the guide plates 3, 4 and has such a width as just capable of engaging the projection 9 therein. The slot width is also such that it can retain the balls 15 while partially exposing them for the rolling contact with the outer surface of the track shaft 30. Being constituted as above, the ball cage 13 can precisely be aligned with the bore of the outer ring 1 by merely engaging the axial ends of the ball slots 14 with the mating projections 9. While the ball cage 13 can be fitted tightly to the inner surface of the bore in the outer ring 1 due to the radially expanding resiliency of its own, projections 20 may be provided, if required, on the seal plates 16, 17 that extend inwardly in contact with the radial inner surface of the ball cage 13 so as to ensure a further reliable fitting.

An effective lubricating mechanism is formed to the ball spline bearing assembly in this embodiment so that lubricant can be fed directly to each of the plural endless ball raceways 5 efficiently and smoothly.

To the outer circumferential surface of the ring main body 2, is formed an arcuate lubricating groove 24 which is fed with lubricant through a feed pipe 34 in a bearing box 33 from an external lubricant source not shown. As shown in details in FIG. 2, the circumferential bottom wall of the lubricating groove 24 is rendered eccentric to the outer circumferential surface of the ring main body 2, which lies on the common diametrical perpendicular Y—Y, by placing the center O' for the arcuate groove below the center O for the ring body 2 by such a distance that the radial depth of the arcuate groove 24 is the deepest at the top of the arc where the lubricant is fed from the feed pipe 34 and gradually decreasing circumferentially toward both ends of the arc where the groove bottom joins the circumferential surface of the ring main body 2 until it disappears. Communication channels (not shown) are formed through the wall of the ring main body 2 between the bottom wall of the lubricating groove 24 and each of the non-load raceways 8 of the endless ball raceways 5.

The lubricant fed through the feed pipe 34 to the deepest portion of the lubricating groove 24 is stored therein and directly supplied through the communication channels to each of the non-load raceways 8 and then cools and lubricates the entire endless raceways. This ensures effective cooling and lubrication with clean lubricant for the ball raceways, by which effective lubricating member is formed, balls can be protected against seizure, and the obstacles such as abrasion metal powder can be discharged rapidly to improve the bearing performance, as well as increase the bearing service life.

The ball spline bearing assembly in this embodiment is assembled by placing the ball cage 13 into the bore of the ring main body 2, fitting the projections 9 on the guide plates 3, 4 into the axial ends of the ball slots 14 in the ball cage 13 and then combining the ring main body 2, guide plates 3, 4 and seal plates 16, 17 together by threading common bolts 22 through the mounting holes 21 apertured in each of the above components. The ball spline bearing assembly is housed within the bearing box 33 and the lubricant is fed from the external lubricant source (not shown) by way of the feed pipe to the lubricating groove 24 at the deepest top and then directly to each of the non-load raceways 8 respectively through the communication channels not shown. While on the other hand, the upper circular portion of the track shaft 30 is fitted into the bore of the ring main body 2 axially slidably under the rolling contact with the balls 15 in the load raceways 6 to thereby obtain a ball spline slide mechanism.

In the ball spline slide mechanism of the embodiment according to this invention, since the ball cage 13 can be aligned exactly with the outer ring 1 with ease by the disposition of the projections 9 formed on the guide plates 3, 4 that constitute the outer ring 1 together with the ring main body 2, the ball cage 13 can be fabricated simple in structure only with a plurality of ball slots 14 forming the load raceways 6. This also makes it easier to ensure the desired high accuracy in the fabrication of the ball slots 14. Moreover, since the lubricant is directly fed from the lubricating groove 24 to each of the non-load raceways 8, cooling and lubrication throughout the entire ball raceways can be effected rapidly, which ensures effective formation of lubricant film, protection of the balls 15 against seizure, as well as efficient discharge of any foreign particles such as metal powder and the like out of the raceways to thereby improve performance and increase the service life of the bearing.

While this invention has been described for the ball spline bearing assembly as applied to the ball spline slide mechanism shown in the drawings, it will be apparent to those skilled in the art that this invention is also applicable to various other ball spline bearing assemblies and ball spline mechanism in practical use thereof, and thus this invention can take various alterations and modifications without departing from the scope of the invention.

I claim:

1. A ball spline bearing assembly comprising:
   an outer ring having a plurality of axially extending non-load ball raceways formed internally thereof and having a plurality of axially extending load raceways of generally semicircular cross section formed in its radially inner surface;
   a shaft fitted axially and slidably within said outer ring, said shaft having a plurality of axially extending load raceways of generally semicircular cross section formed in its radially outer surface;
   a plurality of balls contained in said raceways;
   a ball cage coaxially disposed between the radially inner surface of said outer ring and the radially outer surface of said shaft, said ball cage, having a plurality of axially extending ball slots of substantially uniform cross section for retaining balls disposed in the load raceways formed in part by said outer ring and in part by said shaft; and
   a pair of guide plates located one each at the axial ends of said outer ring, said guide plates being provided with a plurality of channels cooperating one each with the axial end of one of said load raceways and the axial end of one of said non-load raceways, said guide plates including means to secure said ball cage in both axial and rotational alignment with said outer ring.

2. The ball spline bearing assembly of claim 1 wherein the ball slots of said ball cage have an axial length greater than the axial length of said outer ring;
   wherein said guide plates include a portion adapted to project into the axial ends of said ball slots to thereby secure said ball cage in both axial and rotational alignment with said outer ring.

3. The ball spline bearing assembly of claim 2 wherein the surface of the projecting portion of said guide plates facing said outer ring is contiguous with and functions as a part of said channel.

4. A ball spline bearing assembly comprising:
   an outer ring having a plurality of axially extending non-load ball raceways formed integrally thereof and having a plurality of axially extending load raceways of generally semicircular cross section formed in its radially inner surface;
   a shaft fitted axially and slidably within said outer ring, said shaft having a plurality of axially extending load raceways of generally semicircular cross section formed in its radially outer surface;
   a plurality of balls contained in said raceways;
   a ball cage coaxially disposed between the radially inner surface of said outer ring and the radially outer surface of said shaft, said ball cage having a plurality of axially extending ball slots for retaining balls disposed in the load raceways formed by said outer ring and said shaft; and
   a pair of guide plates located one each at the axial ends of said outer ring, said guide plates being provided with channels cooperating one each with the axial end of one of said load raceways and the axial end of one of said non-load raceways;
   said radially outer surface of said outer ring being eccentrically formed to cooperate with the circular cross section inner surface of a bearing box to thereby form an arcuate lubricating groove, said outer ring having a plurality of lubricating passageways communicating from said arcuate groove to each of said non-load raceways.

5. The ball spline bearing assembly as claimed in claim 4, wherein each of said guide plates includes a plurality of knock pins on the axial inner face thereof; and
   wherein said outer ring is provided with a plurality of pin holes axially extending into said outer ring from the axial outer sides thereof at the circumferential positions mating to those of said knock pins to thereby secure said guide plates to said outer ring.

6. The ball spline bearing assembly of claim 5 wherein the radially outer surface of said outer ring is eccentrically formed to cooperate with the circular cross section inner surface of a bearing box to thereby form an arcuate lubricating groove, said outer ring having a plurality of lubricating passageways communicating from said arcuate groove to each of said non-load raceways.

* * * * *